United States Patent
Kojima et al.

(10) Patent No.: US 11,251,896 B2
(45) Date of Patent: Feb. 15, 2022

(54) GENERATIVE MODEL FOR INVERSE DESIGN OF MATERIALS, DEVICES, AND STRUCTURES

(71) Applicant: Mitsubishi Electric Research Laboratories, Inc., Cambridge, MA (US)

(72) Inventors: Keisuke Kojima, Weston, MA (US); Yingheng Tang, West Lafayette, IN (US); Toshiaki Koike-Akino, Belmont, MA (US); Ye Wang, Andover, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/807,784

(22) Filed: Mar. 3, 2020

(65) Prior Publication Data

US 2021/0281349 A1   Sep. 9, 2021

(51) Int. Cl.
*H04J 14/00*    (2006.01)
*H04J 14/02*    (2006.01)

(52) U.S. Cl.
CPC ...... *H04J 14/0215* (2013.01); *H04J 14/0278* (2013.01)

(58) Field of Classification Search
CPC ............... H04J 14/0215; H04J 14/0278; H04J 2203/0089; H04J 3/04; H04J 14/00; H04J 14/02; G06N 3/08; G06N 3/0454; G06N 7/005; G06N 20/00; G06T 2207/20081; H04B 17/373
USPC ........................... 398/68, 67, 69, 77, 79, 82
See application file for complete search history.

(56) References Cited

U.S. PATENT DOCUMENTS

| | | | | |
|---|---|---|---|---|
| 2003/0093713 | A1* | 5/2003 | Werner | G11C 11/56 714/25 |
| 2008/0013738 | A1* | 1/2008 | Tajima | H04L 9/0852 380/278 |
| 2017/0289542 | A1* | 10/2017 | Uranaka | H04N 19/40 |
| 2020/0018815 | A1* | 1/2020 | O'Shea | H04B 1/0003 |
| 2020/0034436 | A1* | 1/2020 | Chen | G06F 40/58 |

\* cited by examiner

*Primary Examiner* — Hibret A Woldekidan
(74) *Attorney, Agent, or Firm* — Gennadiy Vinokur; Hironori Tsukamoto

(57) ABSTRACT

A system is provided for training a device design network. The system includes an interface configured to input data of a device, a memory to store the device design network including an encoder, a decoder, and an adversarial block, and a processor. The processor is, in connection with the memory, configured to update the encoder and the decoder based on a first loss function to reduce the difference between the input data and output data of the decoder, wherein the encoder is constructed by at least one convolutional layer followed by at least one parallel fully connected layer to extract features of a layout of the device, and update the adversarial block to construct by maximizing a second loss function.

18 Claims, 15 Drawing Sheets

1200A

1200B

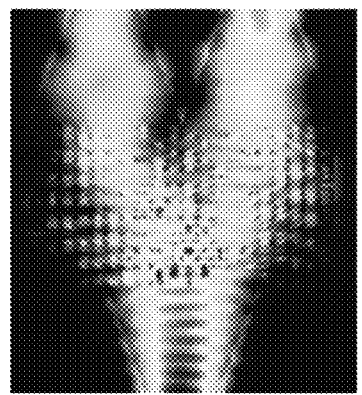
FIG. 13b
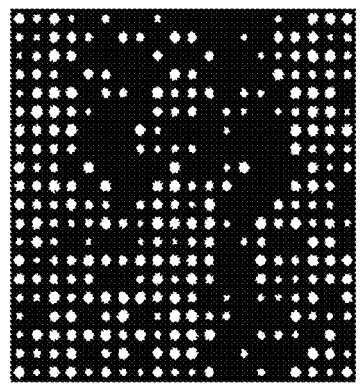
FIG. 13a
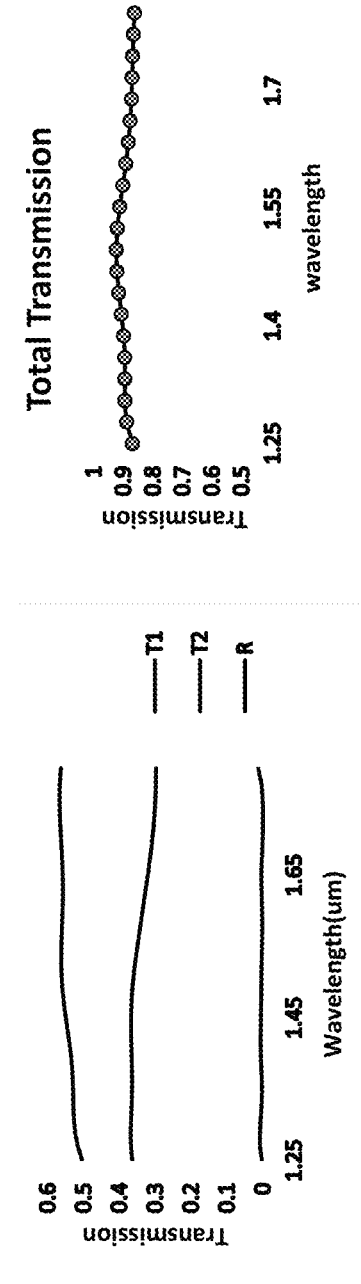
FIG. 13d
FIG. 13c

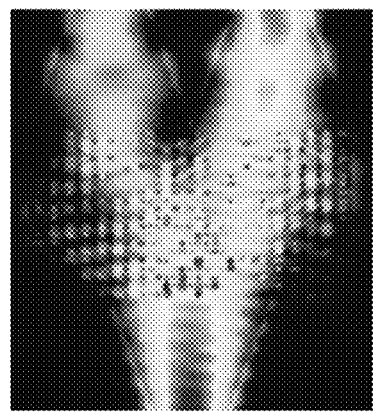
FIG. 14b
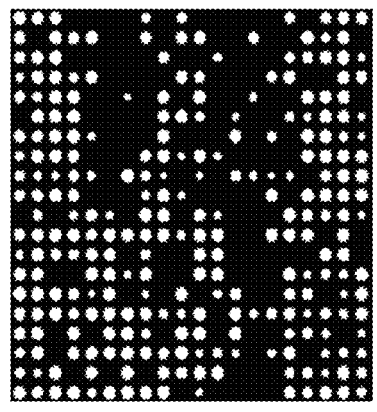
FIG. 14a
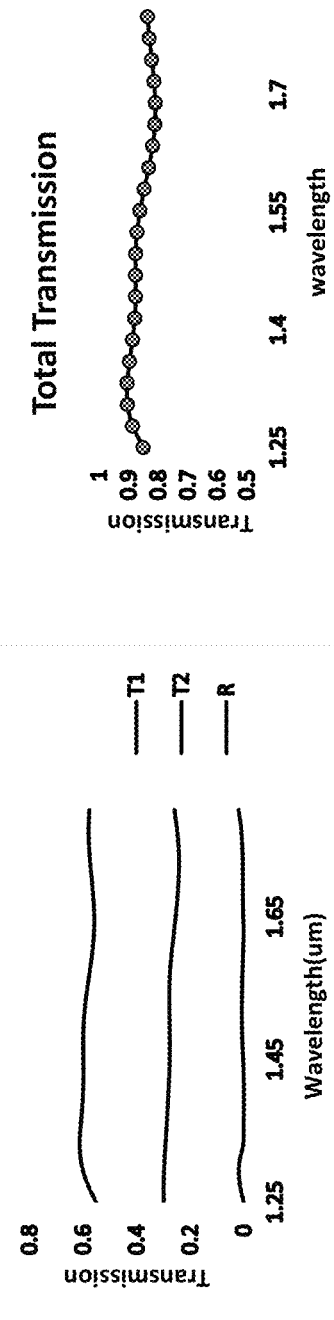
FIG. 14d
FIG. 14c

GENERATIVE MODEL FOR INVERSE DESIGN OF MATERIALS, DEVICES, AND STRUCTURES

FIELD OF THE INVENTION

The invention generally related to method for use conditional variational autoencoder to randomly generate materials, device, or structural designs wherein desired characteristics of materials, devices, or structures are given as conditions. We use adversary network to refine the design.

BACKGROUND OF THE INVENTION

In many areas of materials, devices, and structures, designing is a challenge because tens, hundreds, or even more parameters need to be optimized simultaneously, and each simulation or experiment to verify the updated chracteristics for new parameter sets takes a long time. So efficient optimization methods are desired.

Inverse design of optical devices have used using deep neural network for regression in forward or inverse directions have been done before. (Tahersima et al., Scientific Reports). Once the inverse model is fully trained, it can theoretically generate the design parameters for us. However, the previous inverse neural network model is for optimizing the binary structure (such as 0 or 1), which reduce the dimension of the actual optimization problem. This may bring up some limitations such as narrower bandwidth and semi optimized result which requires to be further optimized. So a better generative model can be used for such a sophisticated optimizing problem.

SUMMARY OF THE INVENTION

The invention proposes to use a conditional variational autoencoder, combined with an adversary network to randomly generate device designs wherein desired device performances are given as conditions. Active training (co-training) can be added for further improving the performance.

Some embodiments of the present disclosure are the silicon photonics splitters based on the MMI structure. The dimension of the final MMI is 2.25 min by 2.25 µm. There are 400 hole-vectors over the MMI structure and these holes have variable hole diameter ranging from 40 µm to 90 µm. The fully trained CVAE model can generate different hole vectors combinations based on different splitting ratio inputs. The overall transmission efficiency for all the generated devices is above 89% across a very broad bandwidth (from 1300 nm to 1800 nm), with negligible insertion loss (below −25 dB). Such model can be applied to different devices such as mode convert, directional coupler and etc.

Some of the embodiments are based on the training data combined with two different datasets: first is the "semi-optimized" results with binary hole size (either no hole or 90 nm hole). The bandwidth for these devices is relatively low (100 nm). The second part of the dataset is combination of multiple patterns along with its performances. According to embodiments, it is shown that with the above "semi-optimized" results, we can train model which is capable of generating devices with excellent performance (90% total transmission) over a broad bandwidth (500 nm). In according to some embodiments of the present disclosure, the model structure is a Conditional Variational Auto Encoder along with the adversarial block, which is based on Bayesian Theorem. It wants the model to underlie the probability distribution of data so that it could sample new data from that distribution. Our training data are generated by doing FDTD simulations. The data are constructed by the following: several DBS simulations and some random generated patterns. The training patterns are all binary holes and the bandwidth is relatively small (1500-1600 nm). The total training data is ~15000.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 13A shows the generated device with the splitting ratio of 6:4, according to embodiments of the present invention;

FIG. 13B shows the simulation result for the generated 6:4 splitter, according to embodiments of the present invention;

FIG. 13C shows the simulation result for the generated 5:5 splitter, according to embodiments of the present invention;

FIG. 13D shows the simulation result for the generated 5:5 splitter, according to embodiments of the present invention;

FIG. 14A shows the generated device with the splitting ratio of 7:3, according to embodiments of the present invention;

FIG. 14B shows the simulation result for the generated 7:3 splitter, according to embodiments of the present invention;

FIG. 14C shows the simulation result for the generated 5:5 splitter, according to embodiments of the present invention;

FIG. 14D shows the simulation result for the generated 5:5 splitter, according to embodiments of the present invention;

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
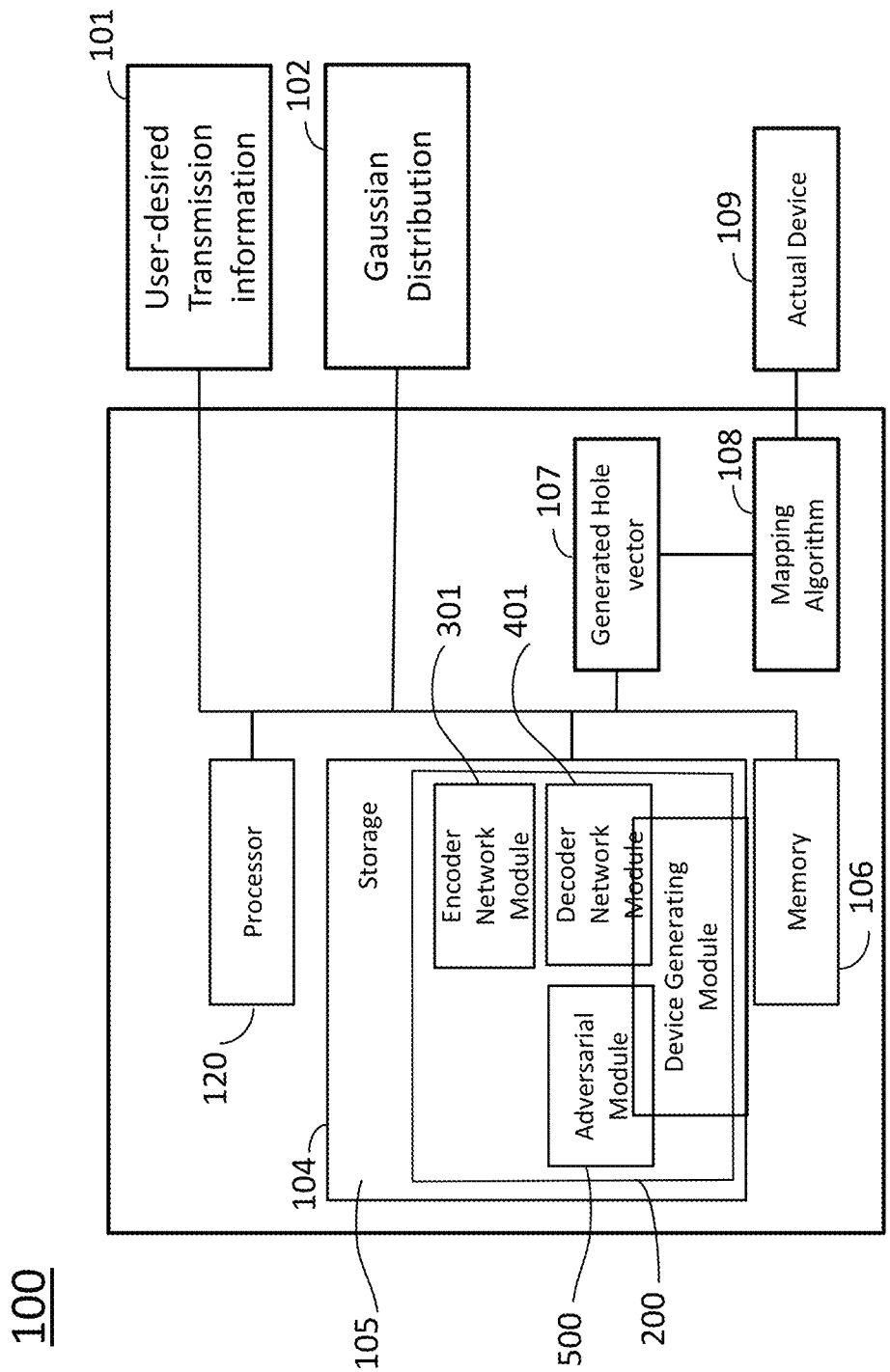
FIG. 1 shows the overall configuration of system, according to embodiments of the present invention.

FIG. 1 is the general structure of the system, when the user feed the desired the transmission information (101) and a standard Gaussian distribution (102) to the Neural Network model, it will generate the corresponding hole vector pattern (107) of the device. Then the system applies the mapping algorithm (1000), to draw the actual device. Such network has been verified under a MMI based splitter model (1100). Once the neural network if fully trained, it can generate the splitter with any arbitrary splitting ratio the users want instantly. Those devices have the overall transmission at around 90% across a very broadband, which is really hard (in terms of time and efficiency) to get by using conventional methods such as Direct Binary Search (DBS).

Figure 2:
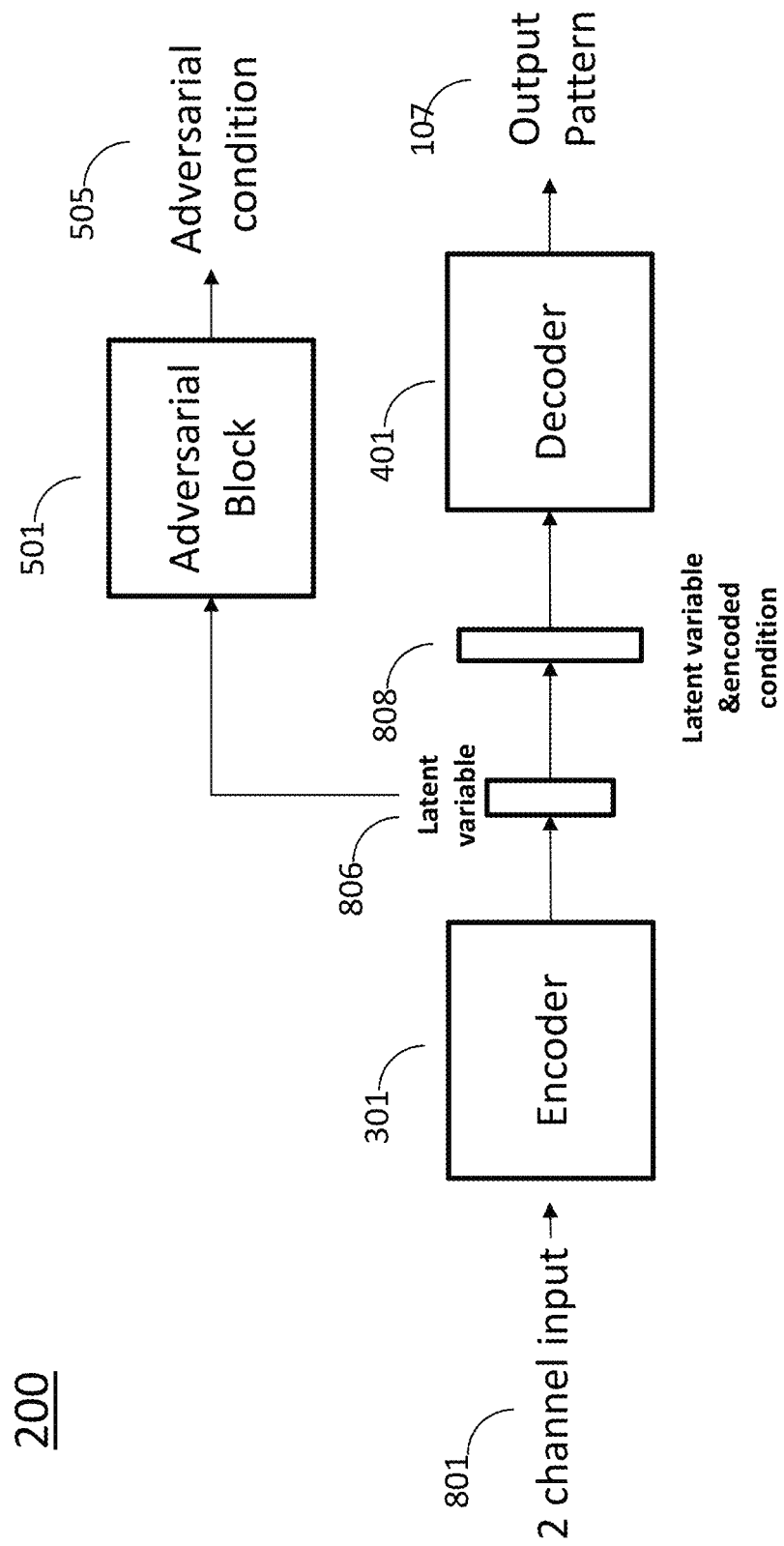
FIG. 2 shows the general adversarial CVAE network, according to embodiments of the present invention.

FIG. 2 shows the overall structure of the Neural network model. The model is constructed with three parts: encoder (301), decoder (401) and the adversarial block (501) (as shown in the FIG. 1). The purpose of the encoder (301) is to extract the input pattern features and represent it using probability distribution which is defined as latent variable (806). The decoder has the similar structure to the encoder but in a reverse order. The purpose of the decoder to generate the device pattern with the latent variable and the encoded condition (807). The final model we are using will be the trained decoder (401).

Figure 3:
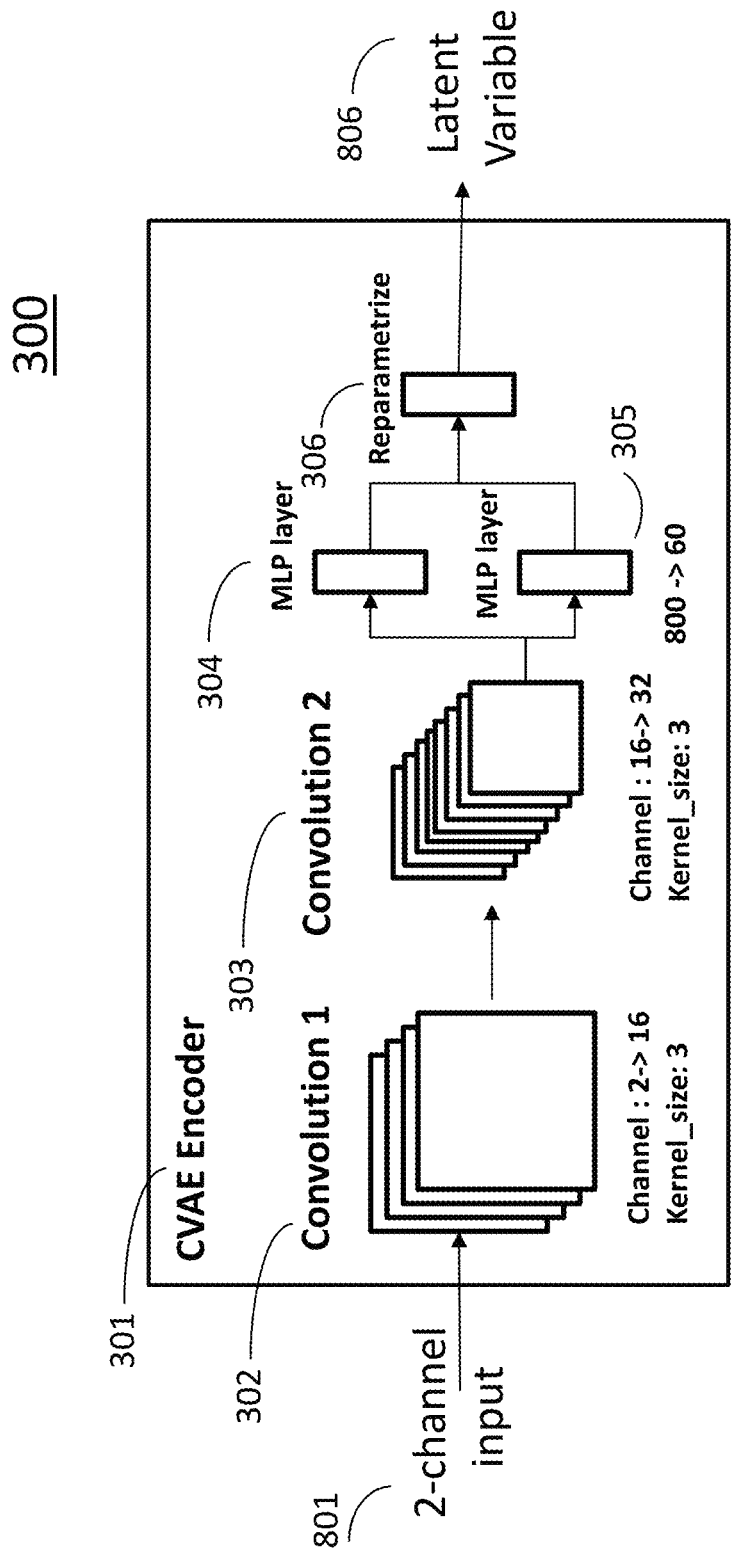
FIG. 3 shows the detailed structure of the CVAE encoder block, according to embodiments of the present invention.

FIG. 3 shows the detailed structure of the encoder. The encoder is constructed by two convolutional layers (303 & 304), (one has 8 channel the second one has 16 channel), followed by two parallel Multilayer Perceptron (MLP) layer (304 & 305). Each of the two parallel MLP layers may be parallel fully connected layers. In some cases, each of the two parallel MLP lasers includes more than two inputs. For instance, the two parallel MLP layers are configured to have have 800->60 input->output dimensions, to generate the extracted pattern (mean (μ) and covariance (σ) for the Gaussian distribution). In order to get the latent variable, the re-parametrization (306) of the mean and the covariance needs to be applied. The equation of the re-parameterization is shown below in Equation 1:

$$\text{Latent Variable} = \mu + \left(e^{\frac{\sigma}{2}} * N\right) \tag{1}$$

Where the N is the random number which obey the standard Gaussian distribution (with mean of 0 and covariance of 1).

Figure 4:
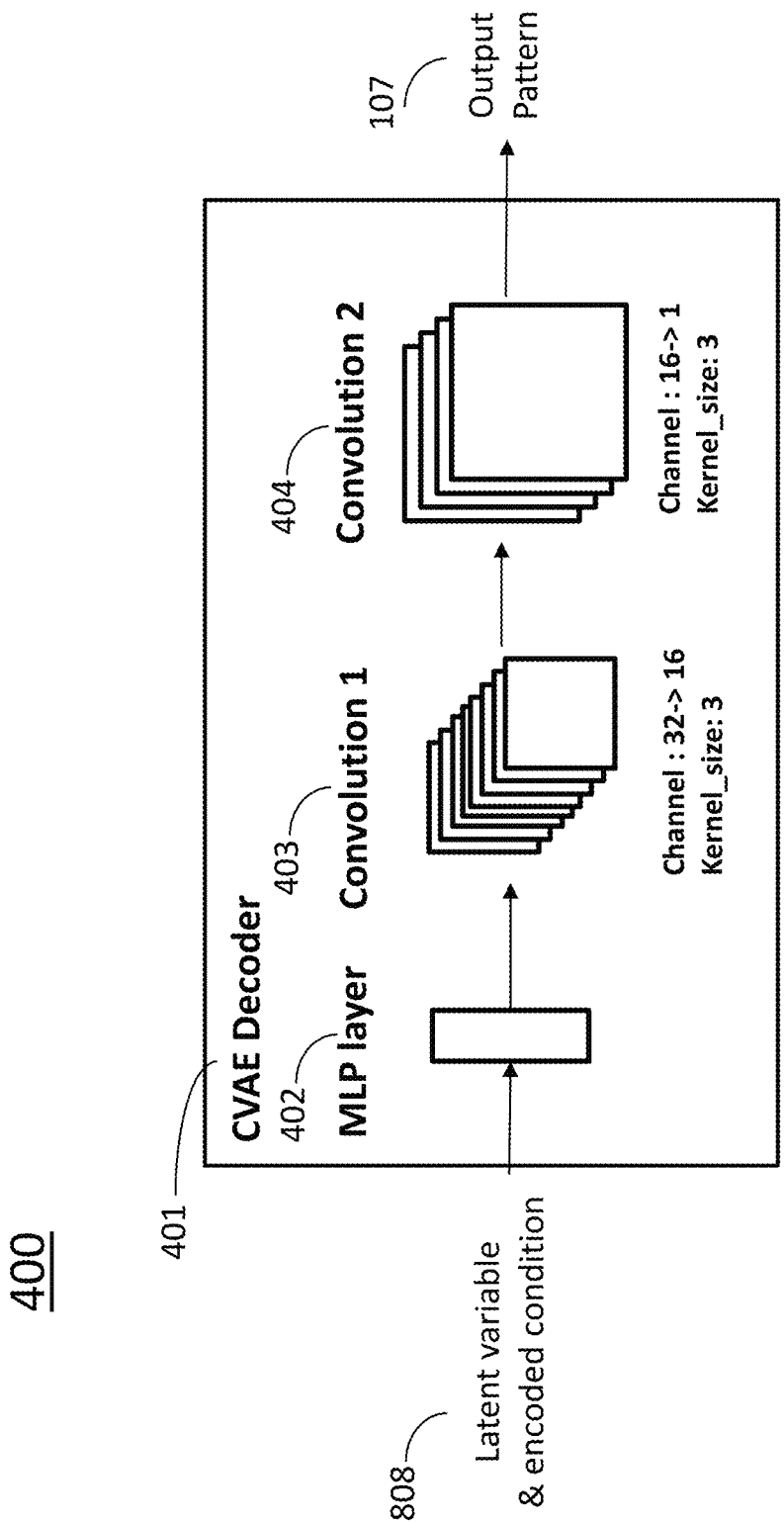
FIG. 4 shows the detailed structure of the CVAE decoder block, according to embodiments of the present invention.

FIG. 4 shows the detailed structure of the decoder. The latent variable from the encoder (806) and the encoded condition data (807) are concatenated to form the input for the decoder (808). Then the combined data are fed into the decoder to generate the pattern. The decoder is combined with one Multilayer perceptron (MLP) layer (402) and two convolutional layers (403 & 404). The MLP layer has the input->output dimension of 69->800. In some cases, each of the two convolutional layers may be designed to have more than 2 channels. For instance, the two convolutional layers have the following specs: first one (403) has 8 channel the second one (404) has 16 channels. The output of second convolutional layer is the generated (or reconstructed) pattern (107). The final model used to generate different devices.

Figure 5:
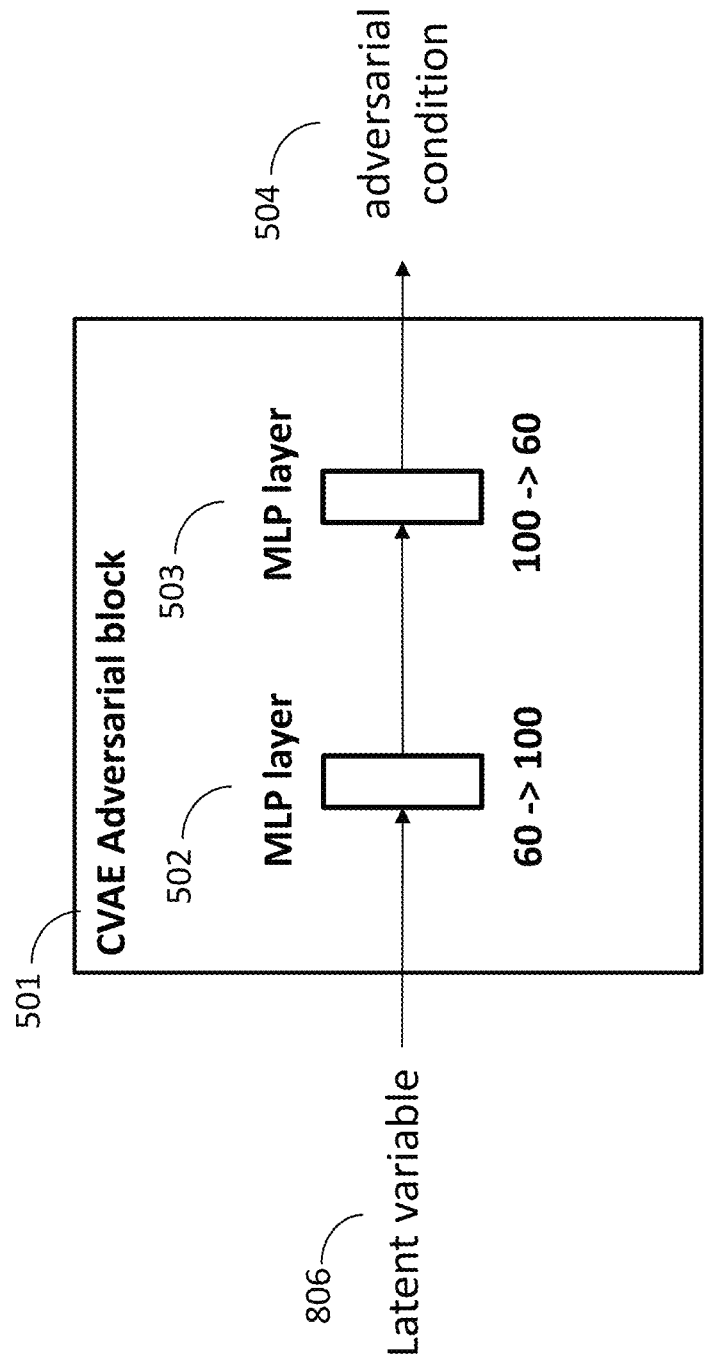
FIG. 5 shows the detailed structure of the adversarial block, according to embodiments of the present invention.

FIG. 5 shows the detailed structure of the adversarial block. The adversarial block has two MLP layers (502 & 503) (the first one has 60->100 input->output dimensions and the second one has 100->60 input->output dimension). The output of the adversarial block is the adversarial condition (504). We add the adversarial block to isolate the latent variable from the conditions in order to fit the device distribution better.

Figure 6:
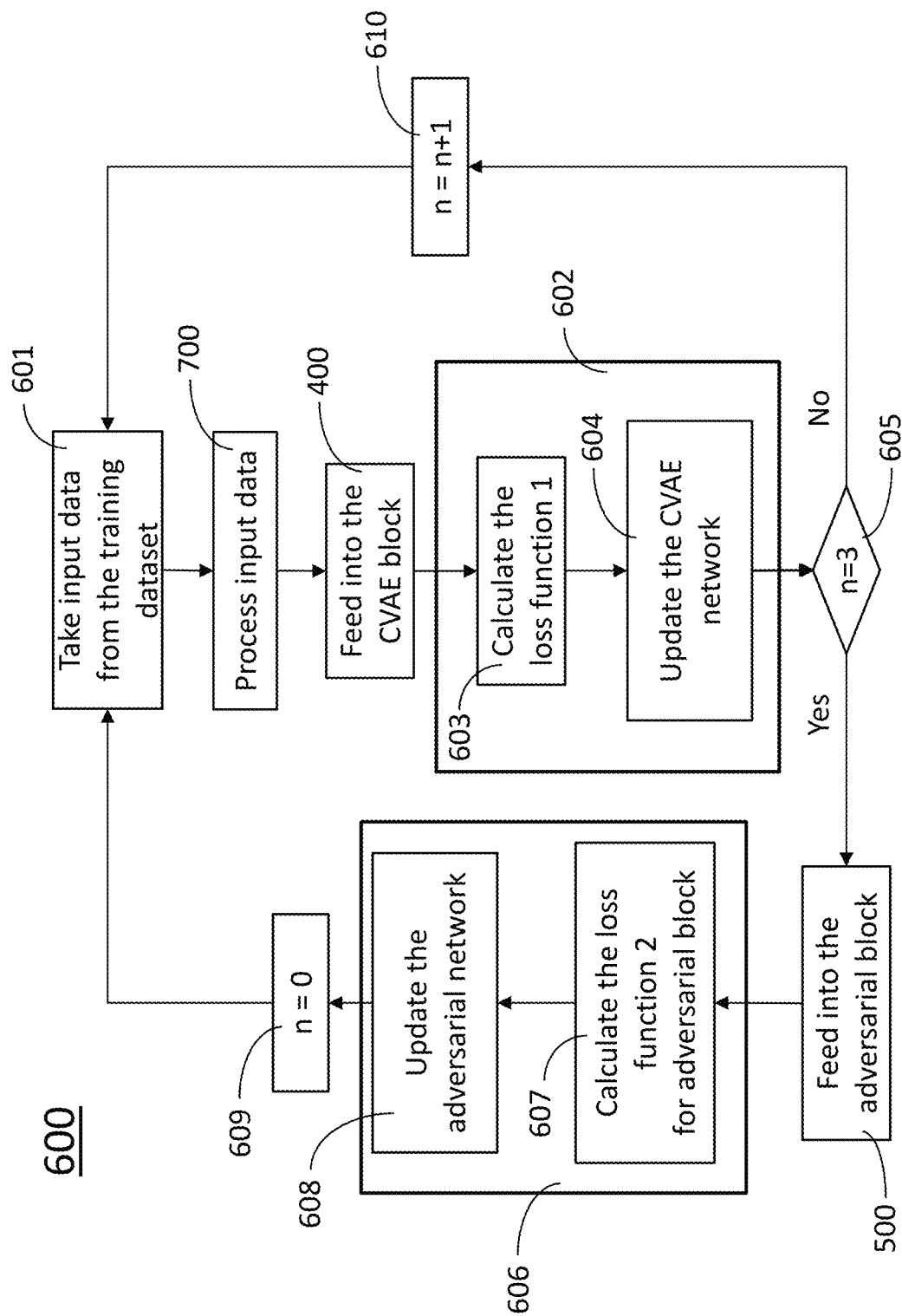
FIG. 6 shows the flowchart of the training process for the model, according to embodiments of the present invention.

FIG. 6 shows the detailed training process for the model. First the data (input pattern and input condition) are taken from the dataset (601), then we process them into two channel input (301) and fed into the network. The process step is shown in 700. The A complete training iteration include two part. Update the CVAE network (602) and update the adversarial block (606). The first loss function, Loss1 is calculated (603) to update the encoder and decoder block (604) (shown in Equation 2) and the second is calculated (607) to update the adversarial block only (608) (shown in Equation 3).

$$\text{Loss1} = -\left[y_n \log x_n + (1-y_n)\log(1-x_n) + \frac{1}{2}\sum_{j=1}^{J}\left[1+\log(\sigma_{zj}^2)^2 - \mu_{zj}^2 - \sigma_{zj}^2\right] - \beta \text{MSE\_LOSS}(s, \bar{s})\right] \quad (2)$$

$$\text{Loss2} = \text{MSE\_LOSS}(s, \bar{s}) \quad (3)$$

Where, $$\text{MSE\_LOSS}(x,y) = (x-y)^2$$

For Loss1, the first portion is the Binary cross entropy loss, the second part is the KL divergence loss and the third part is the Mean Square Error multiplied by a constant β to reach a training balance between the adversarial block and the main model (encoder and decoder). For Loss2, the loss function is just a simple MSE loss. The network update in phase 1 is based on Loss1. By update the weight in the encoder and the decoder, we want to minimize Binary Cross Entropy Loss between the input (702) and the output pattern (107). In the meantime, the difference between the condition (701) and the adversarial condition (505) needs to be maximized so that the encoder only extracted the pattern of the input pattern. The network update in Phase 2 is based on Loss2. In this phase, only the encoder block and the adversarial block are used and only the weight parameters in the adversarial block is updated (608). Here the loss is the MSE Loss between the between the condition (701) and the adversarial condition (505). By update the adversarial block, we want to minimize the MSE loss to form an adversarial relation between the two blocks. In order to achieve the balance between the two phases, Phase 1 updates three times while Phase 2 updates once. In order to do that, we introduce a variable n with initial value of 0. Every time the CVAE block is finished update (604), we check the n value (605). If n is smaller than 3, we add 1 to n and go back to step. If the n is 3, we feed data to update the adversarial block (606) and rest n to 0 (through 609).

Figure 7:
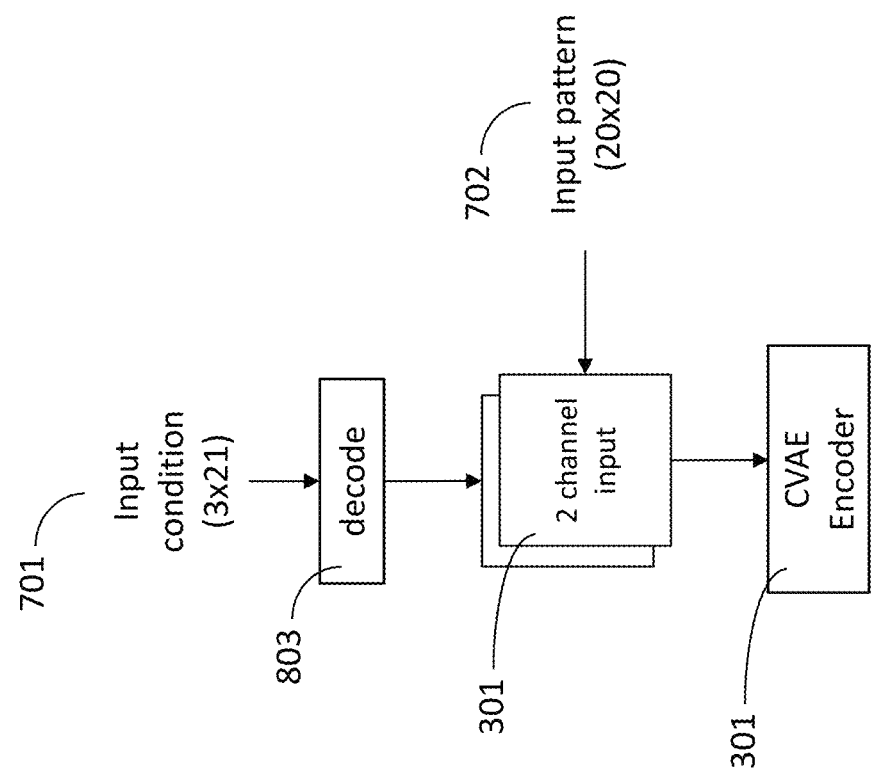
FIG. 7 shows the input data preprocess steps, according to embodiments of the present invention.

FIG. 7 shows the details to process the input data. The input data fed into the network are constructed by two channels (two 20×20 matrix) (801), the first one is the 20×20 input pattern (702) and the second is the decoded (3×20) input condition (701).

Figure 8:
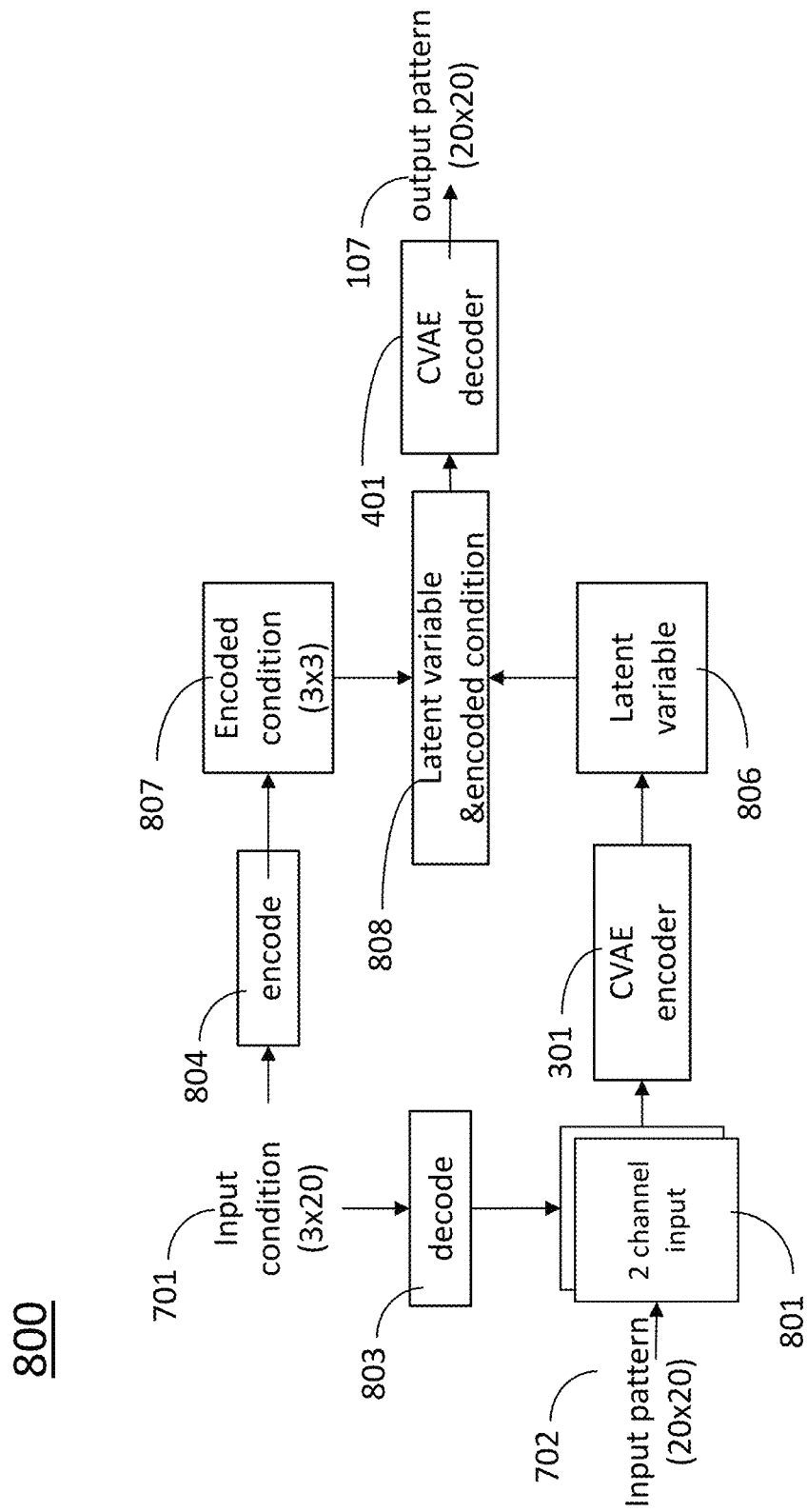
FIG. 8 shows the detailed data flow through the CVAE model, according to embodiments of the present invention.

FIG. 8 shows the dataflow within the network. The input pattern data (702) and the input condition data (803) forms a 2-channel input into the CVAE encoder (301). The encoder then generates the latent variable with dimension of 60. Then the latent variable is concatenated with the encoded condition (with dimension of 9) to form the input to the decoder (808). After being processed by the decoder, the generated (or reconstructed) pattern (107) is the output.

Figure 9:
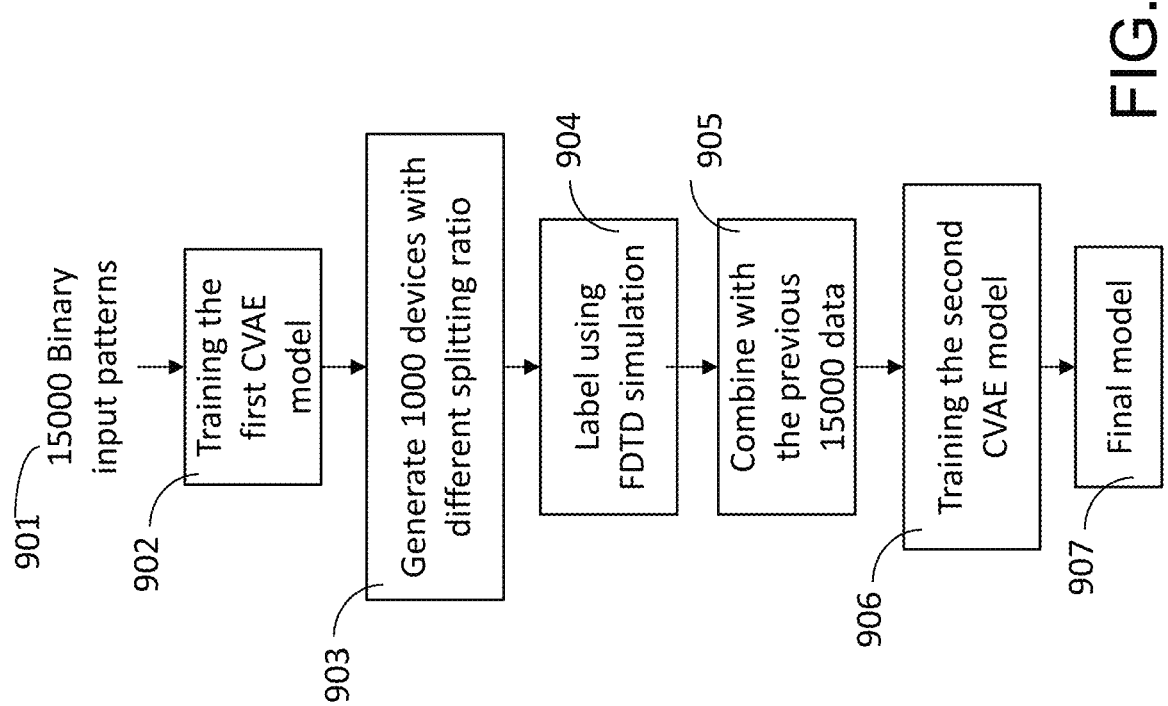
FIG. 9 shows the active learning process for generating the final model, according to embodiments of the present invention.

In order to fully train the Neural network model. We used the concept of active learning. FIG. 9 shows the flowchart of that process. What we are doing is to train a preliminary use the original 15000 binary training data. After finishing the first model. We use it to generate 1000 devices with different holes sizes and label them with their spectrum at each port (condition) through the FDTD simulation. After that, we combine the new generated data along with the existing data to form a new 16000 dataset and retrain the model. Then the second model is the final one that we will be using for the device generation.

Figure 10:
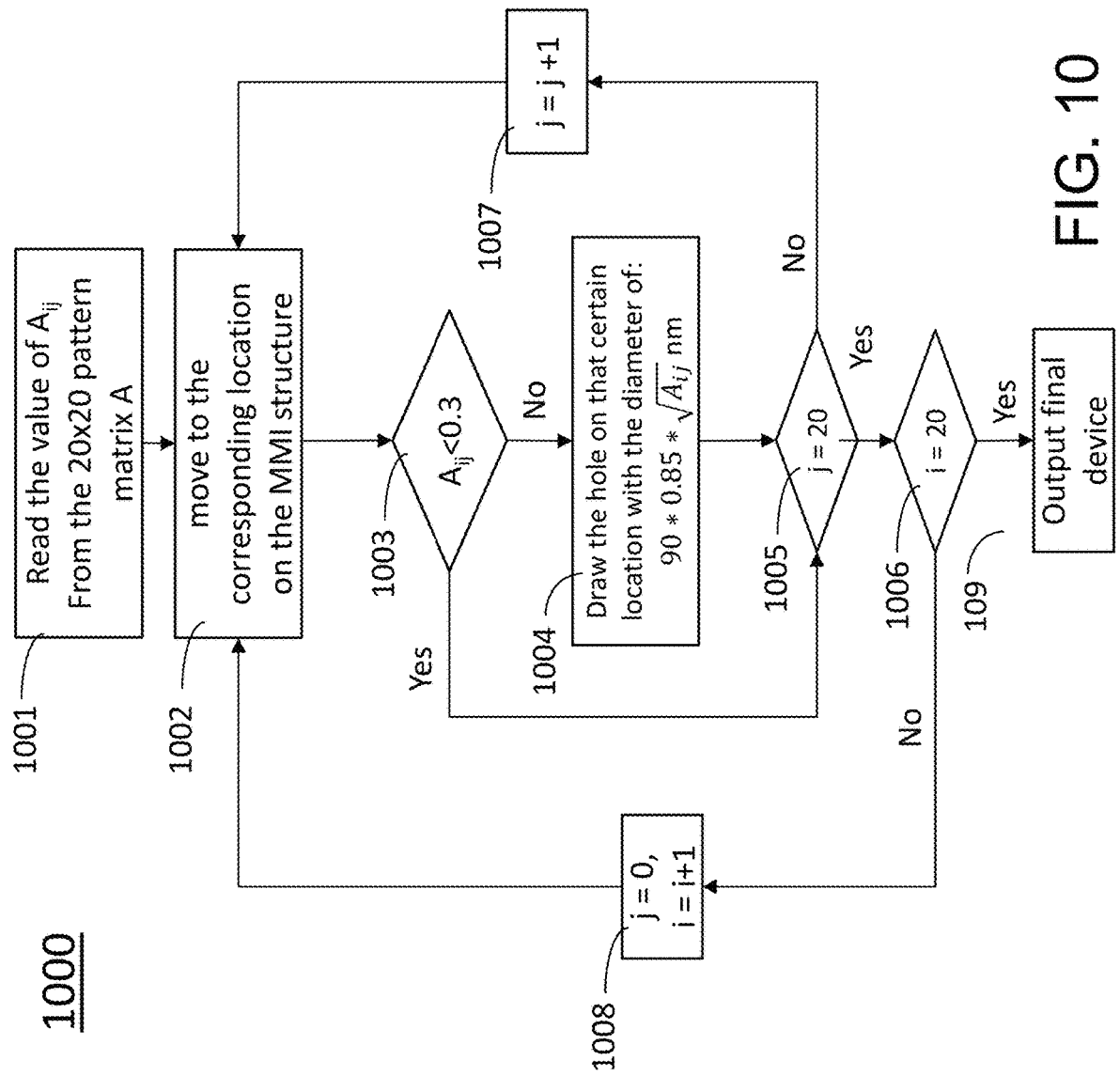
FIG. 10 shows the flowchart of the mapping algorithm of drawing the layout, according to embodiments of the present invention.

FIG. 10 shows mapping algorithm for drawing the actual device. Since the CVAE generated pattern (107) is a 20×20 floating point matrix. Each point represents the Bernoulli distribution for each position point. So the final generated patterns use the variable size instead of binary data to better represent the hole pattern and each floating number in the matrix will be treated as differential hole diameters. The maximum diameter of the hole is 76.5 nm. For easier fabrication, a threshold 0.3 will be set to eliminate any holes that have the diameter below (90*0.85*√0.3 nm). Once the matrix is generated and retrieved (1001), we create two indexes i and j to sweep through the entire matrix (starting from i=j=0). Then we go the element in the matrix $A_{ij}$ (1002) and check if the value is smaller than 0.3 (1003), if it is smaller, then no holes will be created. Otherwise, a hole with the diameter of: $90*0.85*\sqrt{A_{ij}}$ nm will be created on the layout. We will first do the column sweeping (1005) then the row sweeping (1006) to finish the complete process. Once the sweep is done, the final layout will be the output (109)

Figure 11C:
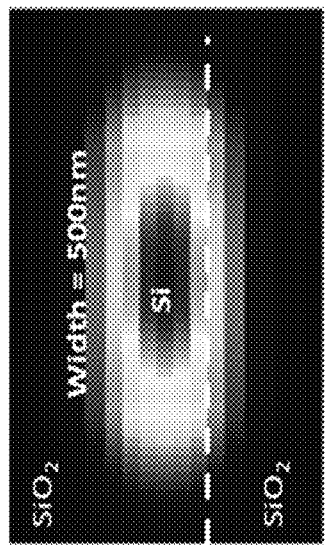
FIG. 11C mode profile at the device cross section, according to embodiments of the present invention.
Figure 11A:
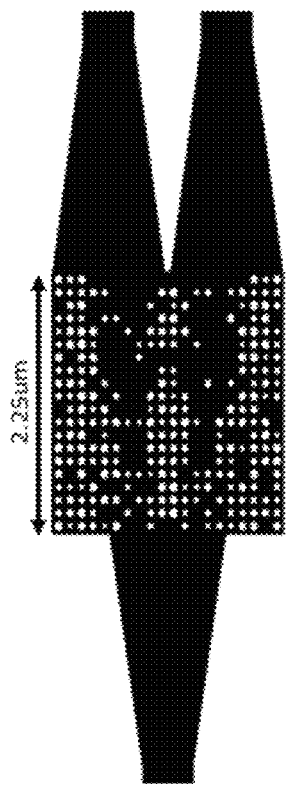
FIG. 11A overall device structure introduction, according to embodiments of the present invention.
Figure 11B:
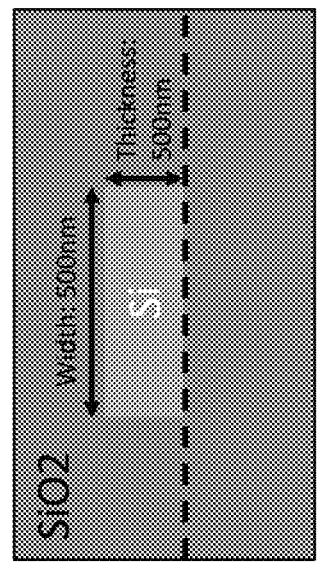
FIG. 11B overall device cross section structure, according to embodiments of the present invention.
Figure 12B:
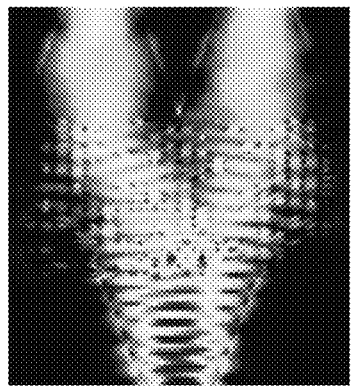
FIG. 12B shows the simulation result for the generated 5:5 splitter, according to embodiments of the present invention.
Figure 12D:
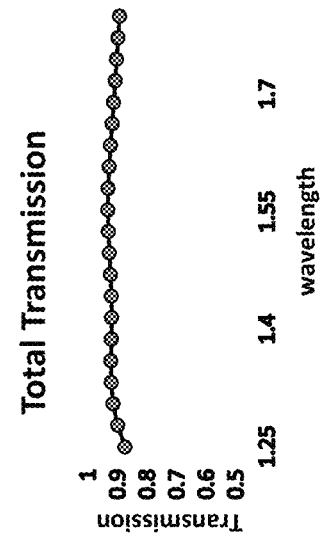
FIG. 12D shows the simulation result for the generated 5:5 splitter, according to embodiments of the present invention.
Figure 12A:
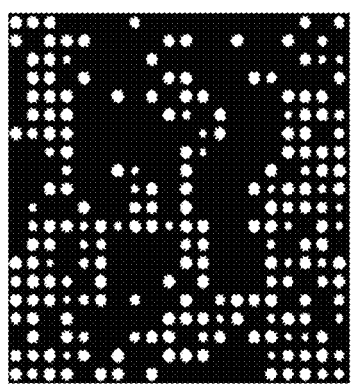
FIG. 12A shows the generated device with the splitting ratio of 5:5, according to embodiments of the present invention.
Figure 12C:
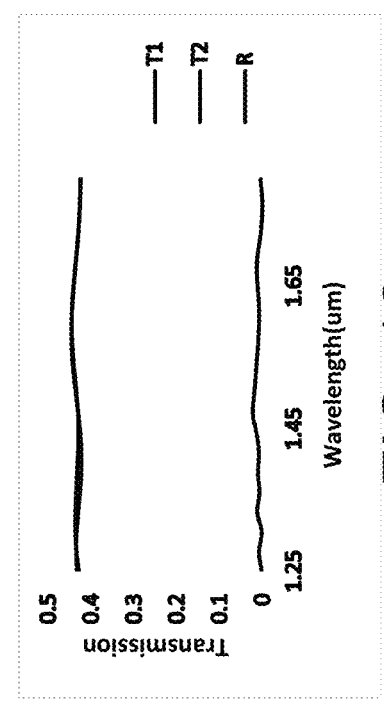
FIG. 12C shows the simulation result for the generated 5:5 splitter, according to embodiments of the present invention.
Figure 15B:
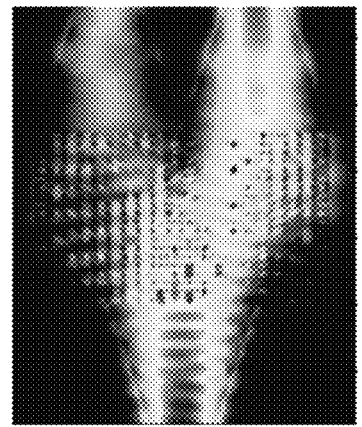
FIG. 15B shows the simulation result for the generated 8:2 splitter, according to embodiments of the present invention.
Figure 15A:
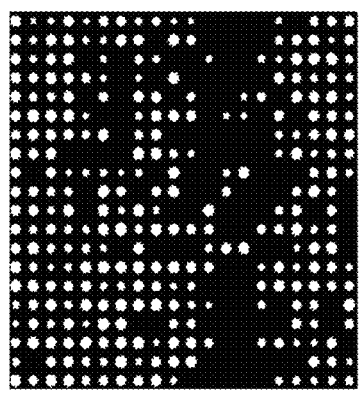
FIG. 15A shows the generated device with the splitting ratio of 8:2, according to embodiments of the present invention.
Figure 15D:
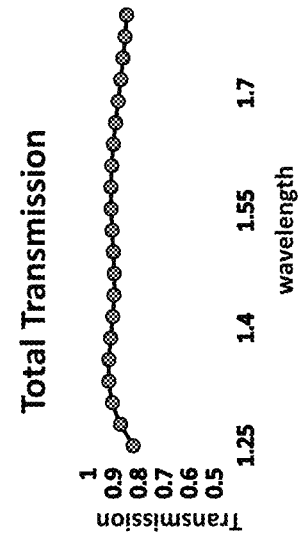
FIG. 15D shows the simulation result for the generated 5:5 splitter, according to embodiments of the present invention.
Figure 15C:
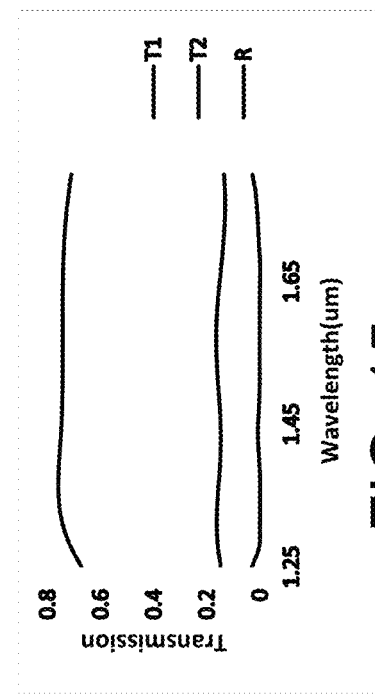
FIG. 15C shows the simulation result for the generated 5:5 splitter, according to embodiments of the present invention.

FIG. 11a-11c shows the device that we are using to apply the system. It is an MMI based optical power splitter. The mechanism of splitting the power is to draw different holes and use the difference in the refractive index to guide the light propagation. The device is designed for TE0 mode use. The MMI structure has footprint of 2.5 um×2.5 um with the oxide cladding. The waveguide has a width of 500 nm and the height of 220 nm. The hole spacing is 130 nm, and the minimum and maximum hole diameter are 76.5 nm, and 42 nm respectively.

The power splitter is formed of nanostructured segments that are arranged in the guide material to effectively guide the input optical beam along predesigned beam paths toward the output ports. In this case, the nanostructured segments is the nanostructured hole that have a refractive index being less than that of the guide material of the power splitter. The Waveguide of the power splitter is Silicon and the material of the nanostructured hole is Silicon Dioxide (SiO2).

FIG. 12A-15A shows a schematic illustrating the power splitters with different splitting ratios (5:5, 6:4, 7:3, and 8:2) that are generated by the fully trained model.

FIG. 12B-15B shows the beam propagation through the devices. We consider the total power at port 1 and port 2 is 100%. The 5:5 splitter meaning port 1 holds 50% of the total output power and the port 2 holds 50% of the total output power. The 6:4 splitter meaning port 1 holds 60% of the total output power and the port 2 holds 40% of the total output power. The 7:3 splitter meaning port 1 holds 70% of the total output power and the port 2 holds 30% of the total output power. The 8:2 splitter meaning port 1 holds 80% of the total output power and the port 2 holds 20% of the total output power.

FIGS. 12C-16C and 12D-16D shows the spectrum response of those devices. The devices that are generated through our Adversarial Conditional Autoencoder have very good performance (with around 90% in total transmission) across the 550 nm bandwidth (from 1250 nm to 1800 nm).

According to some embodiments of present invention, there are the following advantages with respect to the device generated from the model. The devices can be manufactured in very compact sizes. For instance, the footprint can be only 2.25 um×2.25 um or less, which is the smallest splitter according to our knowledge. With such compact size, it has the potential to be massively integrated in optical communication chips with relatively low area budget.

The devices designed according to embodiments of the present invention can operate on a ultra-wide bandwidth (from 1250 nm to 1800 nm) while maintaining an excellent performance (overall 90% transmission), which is 5 times larger than the similar devices reported previously. Accordingly, the devices can cover all the optical communication band (From O band to L band corresponding to wavelengths ranging from 1260 nm to 1625 nm).

The model has been proved to generate any devices that the user want instantly without further optimization, which significantly saves the designing time.

The invention claimed is:

1. A system for training a device design network, comprising:
   an interface configured to input data of a device;
   a memory to store the device design network including an encoder, a decoder, and an adversarial block; and
   a processor, in connection with the memory, configured to:
   update the encoder and the decoder based on a first loss function to reduce the difference between the input data and output data of the decoder, wherein the encoder is constructed by at least one convolutional layers followed by at least one parallel fully connected layer to extract features of a layout of the device; and
   update the adversarial block to construct by maximizing a second loss function.

2. The system of claim 1, wherein each of the two convolutional layers includes more than two channels.

3. The system of claim 2, wherein the two convolutional layers include 8 channels and 16 channels, respectively.

4. The system of claim 1, wherein each of the two parallel fully connected layer include two input/output dimensions.

5. The system of claim 4, wherein each of the two parallel fully connected layer include 800 input/output dimensions and 60 input/output dimensions, respectively.

6. The system of claim 1, wherein the device is an optical power splitter, wherein the extracted features of the layout are mean (μ) and covariance (σ) for the Gaussian distribution.

7. The system of claim 1, wherein the device is a power splitter.

8. The system of claim 1, wherein the device is a WDM device.

9. The system of claim 1, wherein the device is a mode convertor.

10. A computer-implemented method for training a device design network including an encoder, a decoder and an adversarial block stored in a memory in connection with a processor that is configured to perform steps of the method, the steps comprising
    acquire input data of a device via an interface;
    updating the encoder and the decoder based on a first loss function to reduce the difference between the input data and output data of the decoder, wherein the encoder is constructed by at least one convolutional layers followed by at least one parallel fully connected layer to extract features of a layout of the device; and
    updating the adversarial block to construct by maximizing a second loss function.

11. The computer-implemented method of claim 10, wherein each of the two convolutional layers includes more than two channels.

12. The computer-implemented method of claim 11, wherein the two convolutional layers include 8 channels and 16 channels, respectively.

13. The computer-implemented method of claim 10, wherein each of the two parallel fully connected layer include two input/output dimensions.

14. The computer-implemented method of claim 13, wherein each of the two parallel fully connected layer include 800 input/output dimensions and 60 input/output dimensions, respectively.

15. The computer-implemented method of claim 10, wherein the device is an optical power splitter, wherein the extracted features of the layout are mean (μ) and covariance (σ) for the Gaussian distribution.

16. The computer-implemented method of claim 10, wherein the device is a power splitter.

17. The computer-implemented method of claim 10, wherein the device is a WDM device.

18. The computer-implemented method of claim 10, wherein the device is a mode convertor.

* * * * *